United States Patent
Kus et al.

(10) Patent No.: US 9,546,707 B2
(45) Date of Patent: Jan. 17, 2017

(54) HYDRAULIC SUSPENSION DAMPER WITH A POSITION DEPENDENT DAMPING ASSEMBLY

(71) Applicant: BeijingWest Industries, Co., Ltd., Beijing (CN)

(72) Inventors: Pawel Edward Kus, Crakow (PL); Radoslaw Pawel Grzesik, Pcim (PL); Piotr Andrzej Flacht, Crakow (PL); Lukasz Karol Firek, Crakow (PL)

(73) Assignee: BeijingWest Industries Co., Ltd., Beijing (CN)

( * ) Notice: Subject to any disclaimer, the term of this patent is extended or adjusted under 35 U.S.C. 154(b) by 78 days.

(21) Appl. No.: 14/416,160

(22) PCT Filed: Dec. 3, 2012

(86) PCT No.: PCT/CN2012/085728
§ 371 (c)(1),
(2) Date: Jan. 21, 2015

(87) PCT Pub. No.: WO2014/085954
PCT Pub. Date: Jun. 12, 2014

(65) Prior Publication Data
US 2015/0204411 A1    Jul. 23, 2015

(51) Int. Cl.
*F16F 9/58* (2006.01)
*F16F 9/49* (2006.01)
(Continued)

(52) U.S. Cl.
CPC .............. *F16F 9/585* (2013.01); *F16F 9/18* (2013.01); *F16F 9/34* (2013.01); *F16F 9/3488* (2013.01); *F16F 9/48* (2013.01); *F16F 9/49* (2013.01)

(58) Field of Classification Search
CPC ............ F16F 9/585; F16F 9/34; F16F 9/3488; F16F 9/49; F16F 9/348; F16F 9/3481; F16F 9/3482
(Continued)

(56) References Cited

U.S. PATENT DOCUMENTS 2,619,199 A * 11/1952 Schwary .................. F16F 9/49
                                                 188/284
2,729,308 A *  1/1956 Koski ....................... F16F 9/48
                                                 137/513.5
(Continued)

FOREIGN PATENT DOCUMENTS

CA   WO 2008086605 A1 *  7/2008  .............. F16F 9/065
CN          201377535 Y       1/2010
(Continued)

*Primary Examiner* — Melanie Torres Williams
(74) *Attorney, Agent, or Firm* — Dickinson Wright PLLC

(57) ABSTRACT

Provided is a hydraulic damper with a position dependent valve assembly (3) to prevent abrupt stop of a piston at the end of the compression stroke. The position dependent valve assembly (3) comprises a supporting member (31) partitioning damper (2) internal tube (22) and provided with an axial opening (312), an axial member (32) disposed slidably within said axial opening (312) of said supporting member (31), a rigid body (33) fixed on said axial member (32), a compression stroke disc assembly (35) and a rebound stroke disc assembly (34) fixed on said axial member (32).

7 Claims, 3 Drawing Sheets

(51) Int. Cl.
    *F16F 9/18*     (2006.01)
    *F16F 9/34*     (2006.01)
    *F16F 9/348*     (2006.01)
    *F16F 9/48*     (2006.01)

(58) Field of Classification Search
    USPC ... 188/284, 282.5, 282.6, 282.8, 282.9, 316, 188/322.13, 322.14, 322.22, 313
    See application file for complete search history.

(56) References Cited

U.S. PATENT DOCUMENTS

| | | | | |
|---|---|---|---|---|
| 2,742,112 | A * | 4/1956 | Wessel | F16F 9/49 |
| | | | | 137/512 |
| 8,132,654 | B2 * | 3/2012 | Widla | F16F 9/3487 |
| | | | | 188/315 |
| 2008/0277218 | A1 * | 11/2008 | Fox | F16F 9/44 |
| | | | | 188/314 |
| 2010/0059321 | A1 * | 3/2010 | Boivin | F16F 9/49 |
| | | | | 188/284 |
| 2010/0078275 | A1 * | 4/2010 | Kazmirski | F16F 9/512 |
| | | | | 188/280 |

FOREIGN PATENT DOCUMENTS

| | | | |
|---|---|---|---|
| CN | 202100643 U | 5/2011 | |
| CN | 20251060 U | 4/2012 | |
| DE | 1430494 B1 * | 4/1970 | ............... F16F 9/49 |
| JP | 62028539 A | 2/1987 | |
| JP | 2006170243 A | 6/2006 | |

\* cited by examiner

HYDRAULIC SUSPENSION DAMPER WITH A POSITION DEPENDENT DAMPING ASSEMBLY

CROSS REFERENCE TO RELATED APPLICATION

This application claims the benefit of PCT International Application Serial No. PCT/CN2012/085728 filed on Dec. 3, 2012 and entitled a "Hydraulic Suspension Damper with Position Dependent Damping Assembly".

The present invention relates to a hydraulic damper, in particular a motor vehicle suspension damper.

BACKGROUND OF THE INVENTION

Hydraulic suspension dampers typically comprise a tube filled with working liquid, inside of which a slidable piston is placed. The piston is attached to a piston rod led outside the damper through a piston rod guide, and has a form of a piston assembly comprising rebound and compression valves, which control the flow of working liquid passing through the piston during the rebound and the compression stroke of the damper. Some dampers also comprise a base (bottom) assembly with separate rebound and compression valves controlling the flow of working liquid passing in and out of the additional compensation chamber.

Typically, damping force generated by a damper is related to the speed of the piston and motor vehicle suspensions are designed in order to provide unobstructed displacement of the piston up and down within a tube with respect to some neutral position defined for some nominal load of a motor vehicle in rest.

Unfortunately, this neutral position of a piston varies during daily vehicle exploitation. In case of overloaded vehicle, this neutral position of a damper shall obviously be shifted down the compression chamber of a tube, while in case of an empty vehicle it shall obviously be shifted up the rebound chamber of a tube. In both cases this shift of a neutral position may lead to a situation in which displacement of a piston will exceed its assumed stroke limits leading to a suspension closure or jounce bumper engagement, which in turn affects safety, comfort, durability and noise issues. On the other hand, even for a nominally loaded vehicle, displacement of a piston may also exceed its assumed stroke limits, for example while driving on a rough road or during a road bump.

In order to prevent the contact of a piston at the end of compression stroke with elements at the end of a damper compression chamber, compression stops or bumpers are commonly used. Such stops are mounted to a piston or a base valve and aim to block the flow of working liquid to the compensation chamber thus stopping a stroke of a piston. Such compression stops however do not assure appropriate energy dissipation and their action is unrelated to the speed of a piston in a moment of engaging the stop. Therefore their characteristics do not provide proper comfort to passengers of a vehicle, not to mention passengers' safety.

U.S. Patent Application US 2010/0059321 discloses a position sensitive damper having a second damping piston assembly slidably mounted in the tube, independently from the main piston, and biased to a neutral position. The second damping piston assembly has a damping flow path and a bypass flow path which is normally kept in an open state. When an abnormally strong shock occurs, the displacement of the main piston exceeds its normal displacement span and its obstructing portion is placed into obstruction with the bypass flow path, thereby forcing the working liquid through the damping flow path of the second damping piston assembly.

U.S. Pat. No. 4,768,629 discloses a double-tube vibration damper where the piston acts on an abutment spring when arriving at a predetermined position during compression stroke. The abutment spring acts on a control member. The control member, such as a floating disc, cooperates with a compression passage to reduce the cross-sectional area of the compression passage in response to the piston starting to act onto the abutment spring. In this way a hydraulic abutment function is obtained during compression stroke of the piston. The control member is biased by a return spring towards the abutment spring. The abutment spring acts with its end remote from the control member onto a friction ring, which friction ring is frictionally guided by the inner face of the cylinder. The biasing action of the return spring is larger than the force necessary for moving the friction ring along the inner face of the cylinder.

It has been the object of the present invention to provide a damper that would prevent abrupt stop of a piston at the end of the compression stroke, featuring a simple and economical construction with only a few elements, which would provide versatile tuning options. Yet another object of the present invention has been to provide a damper with a position dependent valve assembly that would not require substantial modification of the remaining elements of a damper and might be employed as an add-on device in dampers already manufactured.

SUMMARY OF THE INVENTION

In order to accomplish the aforementioned and other objects, a damper according to the present invention has been provided with a position dependent valve assembly comprising a supporting member partitioning an internal tube of the damper and provided with an axial opening and at least one passage for a substantially unobstructed flow of working liquid between the compression chamber and an additional compression chamber, defined between the base valve assembly and said supporting member;

an axial member disposed slidably within said axial opening of said supporting member and provided at the side of said additional compression chamber with means to limit displacement of the axial member relative to the supporting member into the compression chamber;

a rigid body fixed on said axial member and provided with at least one compression passage and at least one rebound passage for a flow of working liquid between the compression chamber and said additional compression chamber;

a compression stroke disc assembly fixed on said axial member, comprising at least one deflective disc and normally covering the compression side of said at least one compression passage of said body;

a rebound stroke disc assembly fixed on said axial member, comprising at least one deflective disc and normally covering the rebound side of said at least one rebound passage of said body;

a fixing means to secure the position of said body, said compression stroke disc assembly and said rebound stroke disc assembly on said axial member;

a first spring disposed between said supporting member and the compression side of said body to normally press said axial member into the compression chamber;

a second spring secured to the rebound side of said body.

Such a construction enables for providing an increase of a damping force as the piston assembly reaches a predetermined stroke position defined mainly by the height of the position dependent valve assembly and furthermore provides versatile tuning opportunities for shaping this damping force characteristics with regard to the position as well as the velocity of the piston rod due to provision of hydraulic compression and rebound disc assemblies.

The term "rebound" as used in this specification with reference to particular elements of the damper means these elements or these parts of particular elements which point toward the piston rod or in a case of a flow direction of the working liquid it refers to this flow direction that takes place during the rebound stroke of a damper. Similarly the term "compression" as used herein with reference to particular elements of the damper means these elements or parts of elements which point in a direction opposite to the piston rod or in a case of a flow direction of the working liquid it refers to this flow direction that takes place during the compression stroke of a damper.

Preferably said supporting member has a form of an insert fixed between the base assembly and the damper tube. Thanks to that it is possible to easily supplement existing dampers with a position dependent valve assembly with no need of modification of the remaining damper elements.

Preferably said position dependent valve assembly additionally comprises a bumper secured to the rebound side of the second spring.

The bumper may prevent against eventual engaging the free upper end of the second spring with components of the rebound valve of the piston assembly and may also stabilize the second spring thus reducing possible axial deformation of the spring during compressing thereof by the piston assembly.

Preferably the bumper is floatingly disposed within the damper tube. This reduces friction between the bumper and the damper tube.

Preferably said compression stroke disc assembly and/or said rebound stroke disc assembly comprises at least one stopper limiting deflection of said disc assembly.

The stopper provides yet another opportunity for tuning the performance of the damper.

In a preferable construction of a position dependent valve assembly the body is provided with a number of rebound passages, preferably disposed equiangularly around the longitudinal axis thereof;

a number of compression passages, preferably disposed equiangularly around the longitudinal axis thereof, which are radially inner with respect to said rebound passages;

an axial circumferential projection fluidly delimiting an area of outlets of said rebound passages and an area of inlets of said compression passages, and said rebound stroke disc assembly comprises a number of orifices over the area of inlets of said compression passages.

Preferably the stiffness of said first spring is larger than the stiffness of said second spring. Thanks to that, relative displacement of the springs is also differentiated i.e. contraction of the first spring is slower than contraction of the second spring so that it takes some time before the position dependent valve assembly switches from pure mechanic (springs elasticity forces) position dependent mode of operation to mechanic and hydraulic (compression and rebound stroke disc assemblies) mode of operation after the passage between the supporting member and the rigid body is eventually closed. This enables for additional tuning of a position dependent valve assembly.

BRIEF DESCRIPTION OF DRAWINGS

The exemplary embodiments of the present invention are presented below in connection with the attached drawings on which.

DETAILED DESCRIPTION OF THE INVENTION

Figure 1:
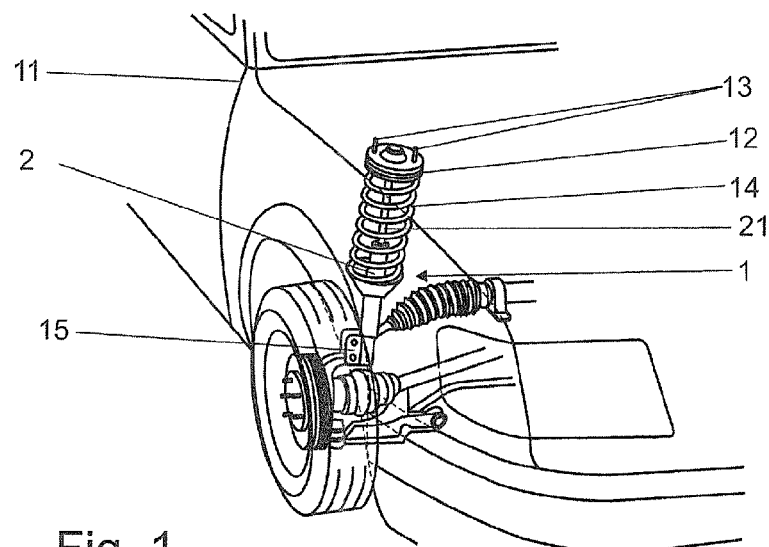
FIG. 1 schematically illustrates a front right motor vehicle suspension.

FIG. 1 schematically illustrates a fragment of an exemplary vehicle suspension 1 attached to a vehicle chassis 11 by means of a top mount 12 and a number of screws 13 disposed on the periphery of the upper surface of the top mount 12. The top mount 12 is connected to a coil spring 14 and a rod 21 of a mono- or twin-tube hydraulic damper 2. Inside a tube of the damper 2 a piston assembly attached to the rod 21 led outside the tube is slidably disposed. At the other end the damper tube is connected to the steering knuckle 15 supporting the vehicle wheel.

Figure 2:
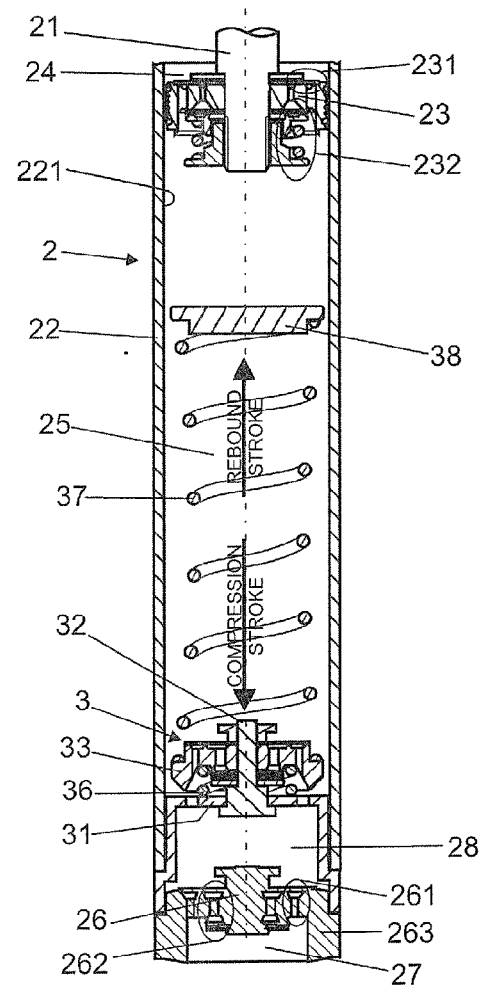
FIG. 2 is a schematic cross-sectional view of a fragment of a hydraulic damper according to the present invention.

A hydraulic damper 2 shown in part in FIG. 2 is an example of a twin-tube damper that may be employed in a vehicle suspension 1 presented in FIG. 1. Schematically depicted movable piston assembly 23 makes a sliding fit with the inner surface 221 of the tube 22, dividing the tube 22 into a rebound chamber 24 (here above the piston assembly) and a compression chamber 25 (here below the piston assembly). At one end the piston rod 21 passes through and is secured to the piston assembly 23. The other end of the piston rod 21 is led axially outside the damper 2 through a sealed rod guide (not shown). The piston assembly 23 is provided with compression 231 and rebound 232 valve assemblies to control the flow of working liquid passing between the rebound chamber 24 and the compression chamber 25 while the piston is in movement.

At the compression end, the tube 22 is closed by a base valve assembly 26 provided with rebound 261 and compression 262 valve assemblies, which control the flow of working liquid passing in and out an additional compensation chamber 27 located between the tube 22 and the second outer tube of the damper (not shown in the drawing).

General principles of operation of a suspension depicted above are well known to those skilled in the art.

The damper 2 is provided with a position dependent valve assembly 3 according to the present invention which in this embodiment has a form of an insert arranged between the body 263 of the valve assembly 26 and the tube 22.

Figure 3:
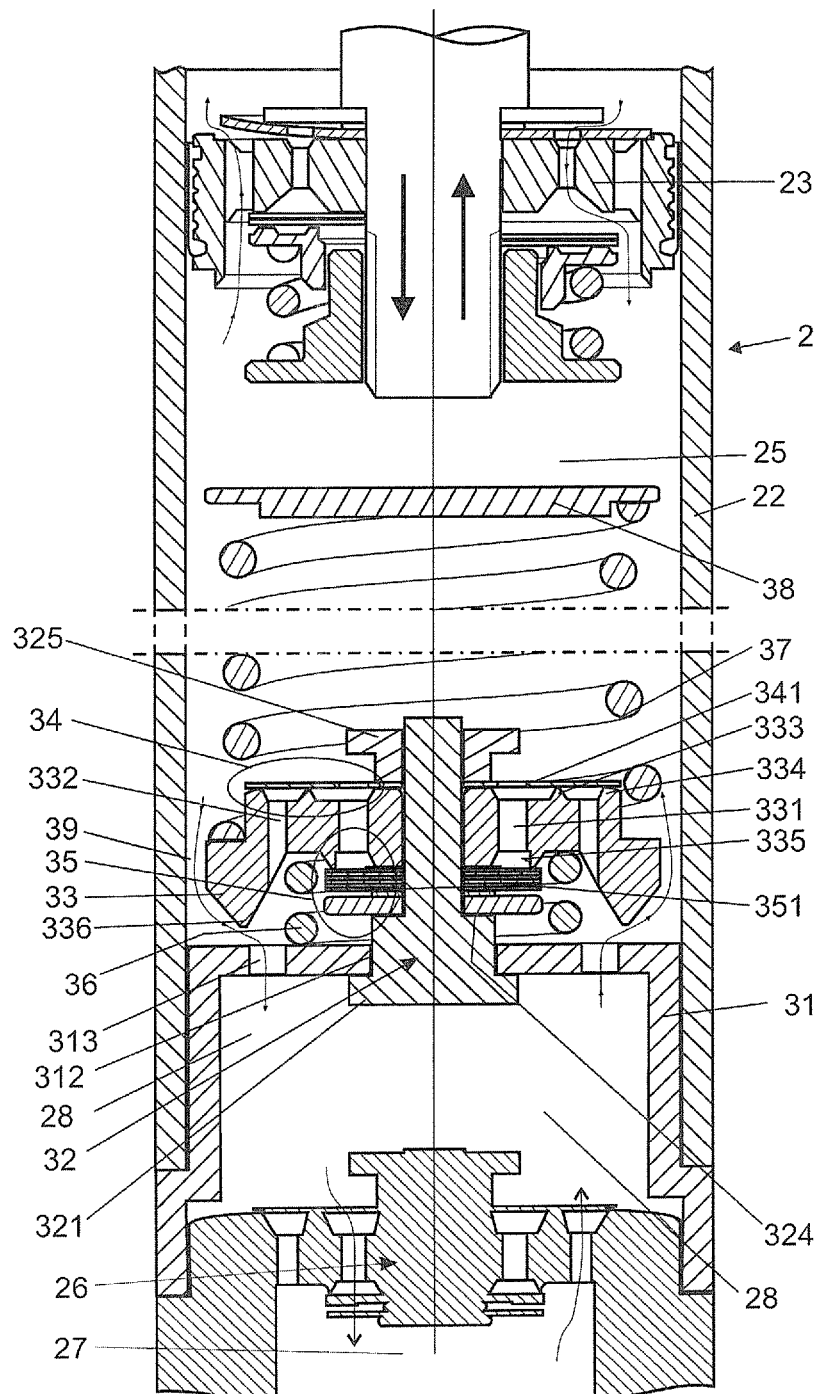
FIG. 3 is a cross-sectional enlarged view of an embodiment of a position dependent valve assembly in normal (inactive) mode of operation.

Inactive position dependent valve assembly 3 is shown in details in FIG. 3 during compression and rebound stroke of the damper (respectively on left and right side of the drawing). This mode of operation takes place while piston assembly 23 strokes remain within designed limits.

The position dependent valve assembly 3 has a supporting member 31 in a form of a sleeve insert fixed to the compression end of the damper tube 22, an axial member 32, a body 33, rebound 34 and compression 35 stroke disc assemblies, two springs 36, 37, and a bumper 38. The supporting member 31 separates the compression chamber 25 from the additional compression chamber 28. Into the open end of the supporting member 31 a base valve assembly 26 is fixedly inserted.

The supporting member 31 is provided with a central axial opening 312 and a number of passages 313 arranged equiangularly around the longitudinal axis of the damper 2.

The axial member 32 is slidably disposed in the axial opening 312 of the supporting member 31. The axial member 32 is provided with an annular projection 321 at the side of the additional compression chamber 28. The annular projection 321 forms a delimiter for an upward slide of the axial member 32.

The axial member 32 is also provided with a resisting surface 324, which in this embodiment is defined by narrower part of the axial member 32. The body 33 and the components of the rebound and compression stroke disc assemblies 34, 35 are provided with central axial openings and are drawn onto this narrower part of the axial member 32. They are secured thereon by fixing means here in a form of a retainer 325.

The body 33 is provided with a number of rebound passages 332 and a number of compression passages 331. Passages 331 and 332 are equiangularly disposed around the longitudinal axis of the body 33, wherein the radius of a circle defined by compression passages 331 is smaller than the radius of a circle defined by said rebound passages 332.

At the rebound side of the body 33, the outlets of the rebound passages 332 are located between two circular concentric inner and outer axial projections 333 and 334, wherein the inner projection 333 fluidly delimits an area of the outlets of said rebound passages 332 and an area of inlets of said compression passages 331. Rebound side of the rebound passages 332 is normally covered by the rebound stroke disc assembly 34 which in this embodiment has a form of a deflective disc 341 with a number of orifices 342 equiangularly disposed over the area of inlets of compression passages 331 of the body 33. Operation of the rebound stroke disc assembly 34 shall be explained in detail with reference to FIG. 4 and FIG. 5.

At the compression side of the body 33, the outlets of the compression passages 331 are located in the interior of the circular axial projection 335 fluidly delimiting an area of the outlets of the compression passages 331 and an area of the inlets of the rebound passages 332. Furthermore, the body 33 is provided at the compression side with a contacting circular edge 336 surrounding the outlets of the rebound passages 332. Compression side of the compression passages 331 is normally covered by the compression stroke disc assembly 35, the functioning of which shall be explained in detail with reference to FIG. 4.

The first spring 36 is disposed between the supporting member 31 and the compression side of the body 33 to normally press the projection 321 of the axial member 32 to the supporting member 31.

The second spring 37 having the stiffness lower than the stiffness of the first spring 36 is fixedly connected to the rebound side of the body 33 and at the other end it is fixedly connected to the bumper 38. The bumper 38 has a form of a plate floatingly disposed in the tube 22.

The state of the position dependent damper assembly 3 depends on the position of the main piston assembly 23.

As presented in FIG. 3, during normal vehicle load conditions the main piston assembly 23 oscillates not touching the bumper 38 and thus the assembly 3 remains inactive. In this state, the position dependent damper assembly 3 is in the uppermost extreme position and working liquid flows in substantially unobstructed manner through annular channel 39 formed between the outer surface of the body 33 and the inner surface 221 of the tube 22 and further through the passages 313 of the supporting member 31 bypassing the rebound and compression stroke disc assemblies 34 and 35.

If the piston assembly 23 exceeds its assumed stroke limits during compression stroke at some point it will start pressing the bumper 38. At first the pressure of the piston assembly 23 will be counteracted only by the resultant pressure of the first spring 36 and the second spring 37 being compressed and the annular channel 39 will still remain in fluid connection with passages 313 of the supporting member 31. Obviously narrower gap between the edge 336 and the supporting member 31 will increase flow restrictions and at some point the compression of the first spring 36 will block this fluid connection through annular channel 39 and passages 313.

Figure 4:
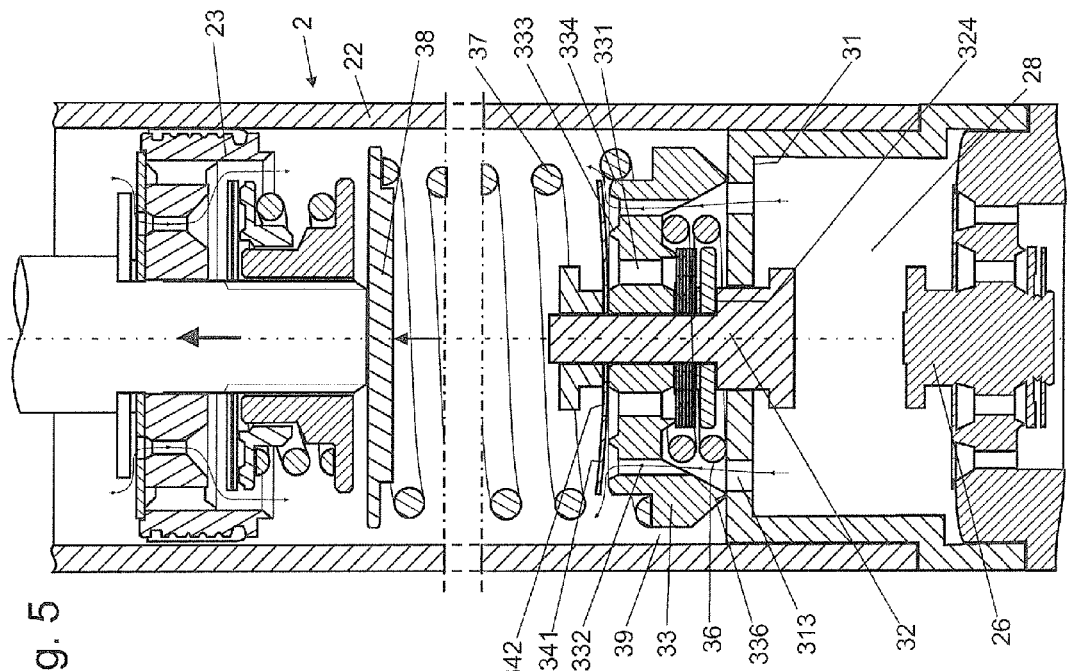
FIG. 4 is a cross-sectional enlarged view of this embodiment of a position dependent valve assembly while activated during damper compression stroke.

This is the position shown in FIG. 4 which presents the lowermost extreme position of the position dependent valve assembly 3 for a compression stroke of the damper 2.

As shown the flow of the working liquid enforced by downwardly displacing piston assembly 23 is now directed (as indicated by arrows) through the orifices 342 disposed equiangularly in a deflective disc 341 and compression passages 331. Pressure of the working liquid leads to a proportional deflection of a compression stroke disc assembly 35 forming a slot between the circular projection 335 and deflected disc assembly 35. Working liquid flows in a restricted manner through this slot and further through the passages 313 of the supporting member 31 to the additional compression chamber 28 and further to the compensation chamber 27.

In this embodiment the compression stroke disc assembly 35 is formed by three deflective discs 351, a limiting sleeve 352, and a stopper 353 that defines maximal allowable deflection of the discs 351.

Mechanical restrictions generated by the springs 36 and 37 and flow restrictions generated by the deflected disc assembly 35 of the position dependent valve assembly 3 will obviously increase proportionally to the position and velocity of the piston. At some point however the piston assembly 23 will stop starting its rebound stroke.

Figure 5:
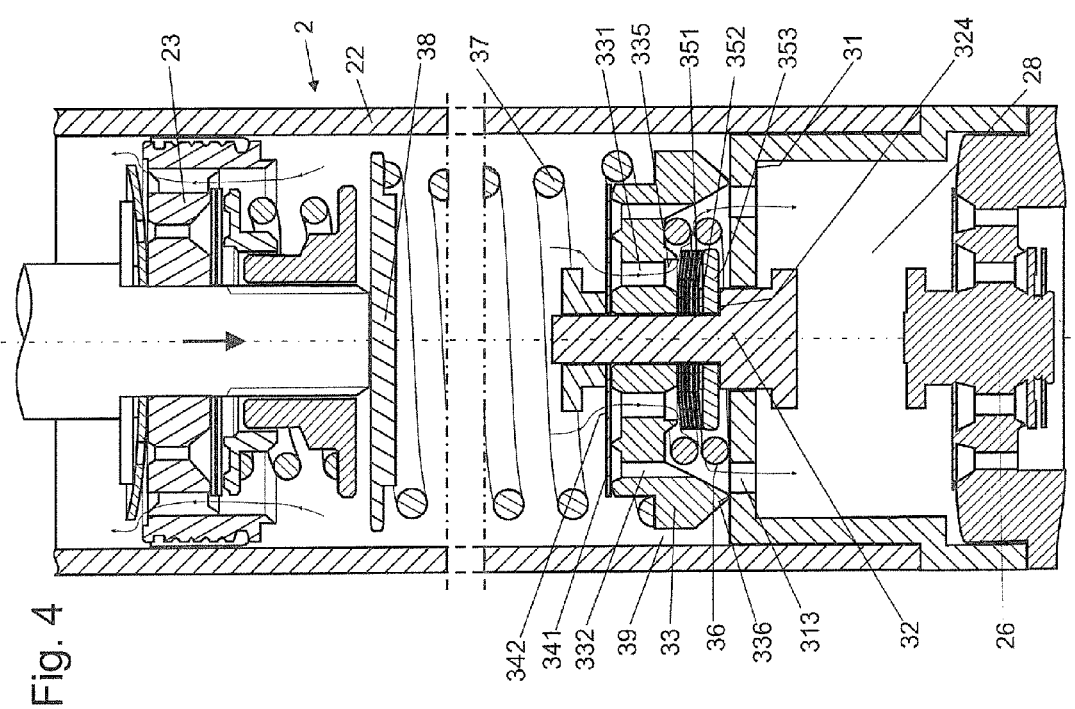
FIG. 5 is a cross-sectional enlarged view of this embodiment of a position dependent valve assembly right before deactivation during damper rebound stroke.

This is the position corresponding to FIG. 5 showing an initial phase of operation of a valve assembly 3 during rebound stroke of the damper 2. As shown the resultant compression of the springs 36 and 37 still blocks fluid connection of the passages 313 with the annular channel 39. Working liquid is therefore sucked from the additional compression chamber 28 by upwardly displacing piston assembly 23 and flows (as indicated by arrows) in a restricted manner through the rebound passages 332 and further through a slot formed between the upwardly deflected disc 341 and the outer projection 334.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper, in particular a motor vehicle suspension damper, comprising:
   a tube filled with working liquid,
   a piston assembly disposed slidably inside the tube dividing the tube into a compression chamber and a rebound chamber and attached to a piston rod led outside the tube through a piston rod guide located at the rebound end of the tube, wherein said piston assembly is provided with rebound and compression valves to control the flow of working liquid passing between said compression chamber and said rebound chamber during rebound and compression stroke of the damper,
   a base valve assembly located at the compression end of the tube, wherein said base valve assembly is provided with rebound and compression valves to control the flow of working liquid passing between said compression chamber and an additional compensation chamber located outside the tube, and
   a position dependent valve assembly,
   wherein said position dependent valve assembly (3) comprises:
   a supporting member (31) partitioning an internal tube (22) of the damper (2) and provided with an axial opening (312) and at least one passage (313) for a substantially unobstructed flow of working liquid between the compression chamber (25) and an additional compression chamber (28), defined between the base valve assembly (26) and said supporting member (31);
   an axial member (32) disposed slidabiy within said axial opening (312) of said supporting member (31) and provided at the side of said additional compression chamber (28) with means (321) to limit displacement of the axial member relative to the supporting member (31) into the compression chamber (25);
   a rigid body (33) fixed on said axial member (32) and provided with at least one compression passage (331) and at least one rebound passage (332) for a flow of working liquid between the compression chamber (25) and said additional compression chamber (28);
   a compression stroke disc assembly (35) fixed on said axial member (32), comprising at least one deflective disc (351) and normally covering the compression side of said at least one compression passage (331) of said body (33);
   a rebound stroke disc assembly (34) fixed on said axial member (32), comprising at least one deflective disc (341) and normally covering the rebound side of said at least one rebound passage (332) of said body (33);
   fixing means (325) to secure the position of said body (33), said compression stroke disc assembly (35) and said rebound stroke disc assembly (34) on said axial member (32);
   a first spring (36) disposed between said supporting member (31) and the compression side of said rigid body (33) to normally press said axial member (32) into the compression chamber (25); and
   a second spring (37) secured to the rebound side of said body (33).

2. The hydraulic damper according to claim 1, wherein said supporting member (31) has a form of an insert fixed between the base assembly (26) and the damper tube (22).

3. The hydraulic damper according to claim 2, wherein said position dependent valve assembly (3) additionally comprises a bumper (38) secured to the rebound side of the second spring (37).

4. The hydraulic damper according to claim 3, wherein said bumper (38) is floatingly disposed within the damper tube (22).

5. The hydraulic damper according to claim 4, wherein said compression stroke disc assembly (35) and/or said rebound stroke disc assembly comprises at least one stopper (353) limiting deflection of said disc assembly (35).

6. The hydraulic damper according to any of claim 1 wherein said rigid body (33) is provided with:
   a number of rebound passages (332), disposed equiangularly around the longitudinal axis thereof;
   a number of compression passages (331), disposed equiangularly around the longitudinal axis thereof, which are radially inner with respect to said rebound passages (332); an axial circumferential projection (333) fluidly delimiting an area of outlets of said rebound passages (332) and an area of inlets of said compression passages (331), and
   said rebound stroke disc assembly (34) comprises a number of orifices over the area of inlets of said compression passages (331).

7. The hydraulic damper according to claim 1 wherein the stiffness of said first spring (36) is larger than the stiffness of said second spring (37).

* * * * *

UNITED STATES PATENT AND TRADEMARK OFFICE
CERTIFICATE OF CORRECTION

PATENT NO. : 9,546,707 B2  
APPLICATION NO. : 14/416160  
DATED : January 17, 2017  
INVENTOR(S) : Pawel Edward Kus et al.

Page 1 of 1

It is certified that error appears in the above-identified patent and that said Letters Patent is hereby corrected as shown below:

In the Claims

Column 7, Line 31 "slidabiy" should read -- slidably --

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*